US011431221B2

(12) United States Patent
Stafford et al.

(10) Patent No.: US 11,431,221 B2
(45) Date of Patent: Aug. 30, 2022

(54) BRUSHLESS MOTOR

(71) Applicant: Dyson Technology Limited, Wiltshire (GB)

(72) Inventors: Thomas Richard Stafford, Bath (GB); Vadivel Kumaran Sivashanmugam, Swindon (GB); Lukasz Andrzej Kowalczyk, Swindon (GB)

(73) Assignee: Dyson Technology Limited, Malmesbury (GB)

( * ) Notice: Subject to any disclaimer, the term of this patent is extended or adjusted under 35 U.S.C. 154(b) by 0 days.

(21) Appl. No.: 16/976,780

(22) PCT Filed: Feb. 19, 2019

(86) PCT No.: PCT/GB2019/050446
§ 371 (c)(1),
(2) Date: Aug. 31, 2020

(87) PCT Pub. No.: WO2019/166774
PCT Pub. Date: Sep. 6, 2019

(65) Prior Publication Data
US 2021/0367476 A1 Nov. 25, 2021

(30) Foreign Application Priority Data

Mar. 1, 2018 (GB) ...................... 1803347

(51) Int. Cl.
*H02K 5/24* (2006.01)
*H02K 1/14* (2006.01)
(Continued)

(52) U.S. Cl.
CPC ............... *H02K 5/24* (2013.01); *H02K 1/141* (2013.01); *H02K 1/185* (2013.01); *H02K 3/524* (2013.01); *H02K 9/06* (2013.01); *H02K 2205/12* (2013.01)

(58) Field of Classification Search
CPC .... H02K 1/141; H02K 1/185; H02K 2205/12; H02K 3/524; H02K 5/24; H02K 9/06
See application file for complete search history.

(56) References Cited

U.S. PATENT DOCUMENTS 4,883,982 A * 11/1989 Forbes .................. F04D 29/582
310/62
8,475,111 B2 * 7/2013 Stagg .................... F04D 29/326
415/1
(Continued)

FOREIGN PATENT DOCUMENTS

CN         201328048 Y     10/2009
CN         105340159 A      2/2016
(Continued)

OTHER PUBLICATIONS

International Search Report and Written Opinion dated May 15, 2019, directed to International Application No. PCT/GB2019/050446; 13 pages.
(Continued)

*Primary Examiner* — Naishadh N Desai
(74) *Attorney, Agent, or Firm* — Faegre Drinker Biddle & Reath LLP

(57) ABSTRACT

A brushless motor has a rotor assembly including a shaft, an impeller, a bearing assembly and a rotor core. The brushless motor has a stator assembly and a frame having an outer portion and an inner portion radially inward of the outer portion. The inner portion supports at least one of the rotor assembly and the stator assembly. The brushless motor has a strut extending between the outer portion and the inner portion. The strut extends at least partially into a recess formed in the stator assembly.

11 Claims, 5 Drawing Sheets

(51) Int. Cl.
*H02K 1/18* (2006.01)
*H02K 3/52* (2006.01)
*H02K 9/06* (2006.01)

(56) References Cited

U.S. PATENT DOCUMENTS

| | | | |
|---|---|---|---|
| 8,593,022 B2* | 11/2013 | Lau | H02K 9/06 |
| | | | 310/62 |
| 2010/0311318 A1 | 12/2010 | Hause et al. | |
| 2014/0158131 A1* | 6/2014 | Kenyon | A61M 16/0066 |
| | | | 128/204.18 |
| 2016/0156242 A1 | 6/2016 | Eckert et al. | |
| 2017/0170693 A1 | 6/2017 | Dymond et al. | |
| 2018/0034392 A1* | 2/2018 | Hause | A01K 1/0052 |

FOREIGN PATENT DOCUMENTS

| | | |
|---|---|---|
| CN | 205029444 U | 2/2016 |
| CN | 106451829 A | 2/2017 |
| CN | 106921226 A | 7/2017 |
| DE | 102011122534 A1 | 6/2013 |
| EP | 2091135 A1 | 8/2009 |
| JP | S54-105903 A | 8/1979 |
| JP | H4-197053 A | 7/1992 |
| JP | H7-15910 A | 1/1995 |
| JP | 2003-201986 A | 7/2003 |
| KR | 10-1127379 B1 | 3/2012 |
| RU | 2068610 C1 | 10/1996 |
| WO | 2017/098202 A1 | 6/2017 |
| WO | 2018/234736 A1 | 12/2018 |

OTHER PUBLICATIONS

Search Report dated Jul. 4, 2018, directed to GB Application No. 1803347.2; 1 page.

Office Action received for Chinese Patent Application No. 201980016260.9, dated Mar. 2, 2022, 15 pages (9 pages of English Translation and 6 pages of Original Document).

* cited by examiner

BRUSHLESS MOTOR

REFERENCE TO RELATED APPLICATIONS

This application is a national stage application under 35 USC 371 of International Application No. PCT/GB2019/050446, filed Feb. 19, 2019, which claims the priority of United Kingdom Application No. 1803347.2, filed Mar. 1, 2018, the entire contents of each of which are incorporated herein by reference.

FIELD OF THE DISCLOSURE

The present disclosure relates to a brushless motor.

BACKGROUND OF THE DISCLOSURE

There is a general desire to improve electric motors in a number of ways. In particular, improvements may be desired in terms of size, weight, manufacturing cost, efficiency, reliability and noise.

SUMMARY OF THE DISCLOSURE

According to a first aspect of the present invention there is provided a brushless motor comprising: a rotor assembly comprising a shaft, an impeller, a bearing assembly and a rotor core; a stator assembly; a frame comprising an outer portion and an inner portion radially inward of the outer portion, the inner portion supporting at least one of the rotor assembly and the stator assembly; and a strut extending between the outer portion and the inner portion, wherein the strut extends at least partially into a recess formed in the stator assembly.

The brushless motor according to the first aspect of the present invention may be advantageous principally as the brushless motor comprises a strut extending between the outer portion and the inner portion, and the strut extends at least partially into a recess formed in the stator assembly. In particular, the strut may act to fix the outer portion to the inner portion, but as the strut extends at least partially into a recess formed in the stator assembly there may be no gap, for example no gap in an axial direction, between an end of the stator assembly and an end of the strut. This may inhibit flow separation at the end of the stator assembly, may inhibit air from eddying between the stator assembly and the strut, and may contribute to a reduction in turbulence at the impeller inlet resulting in overall compressor pressure rise.

The strut may extend into the recess such that there is axial overlap between the strut and the stator assembly. For example the strut and the stator assembly may overlap in a direction substantially parallel to an axis of rotation of the impeller. The stator assembly and the strut may be axially aligned, for example aligned in a direction substantially parallel to an axis of rotation of the impeller. The stator assembly and the strut may share a common central axis.

The strut may extend into the recess such that such that side surfaces of the strut, for example surfaces of the strut which extend in an axial direction substantially parallel to an axis of rotation of the impeller, are positioned at the end of stator assembly. Thus airflow may not need to change direction a significant amount, or indeed at all, in order to flow around the strut because the airflow is already flowing around the stator assembly. This may contribute to a reduction in turbulence and noise within the motor.

The stator assembly and the strut may be positioned upstream of the impeller. This may be beneficial as this may provide straighter airflow into the impeller in use. This may improve the efficiency of the brushless motor and/or contribute to a reduction of noise in the motor in use. Air may flow over the stator assembly and then over the strut towards the impeller in use. This may be beneficial as the air may provide a cooling effect for the stator assembly and may, for example, provide an increased cooling effect relative to a stator assembly located downstream of the impeller, where air flowing over the stator assembly has already been worked on by the impeller.

The stator assembly may comprise a bobbin and a stator core, and the recess may be formed in the bobbin. This may be beneficial over, for example, an arrangement where the recess is formed in the stator core, as forming a recess in the stator core to accommodate the strut may interfere with the desired magnetic properties of the stator core.

The bobbin may comprise first and second arms, and the first and second arms may be spaced apart to define the recess. The recess may define a space for receiving windings of the stator assembly and a space for receiving the strut. This may be beneficial as it may make use of an existing space for receiving the windings to receive the strut. The windings and the strut may be spaced apart within the recess.

The strut may comprise an aerofoil-like profile. The strut may comprise a leading edge, for example an upstream edge, and the leading edge may have a curved profile when viewed in a plane parallel to a direction of airflow through the motor in use. This may be beneficial as this may promote flow of air around the strut, and may avoid the provision of a sharp edge within the airflow through the motor. The leading edge may define a convex surface when viewed in a direction of airflow through the motor in use.

Substantially the entirety of the leading edge of the strut may be received within the recess, for example such that the leading edge of the strut is not visible when viewed in a direction of airflow through the motor in use and the leading edge is covered by the stator assembly. This may be beneficial as the leading edge may not extend directly into the flow of air through the motor in use. This may provide improved efficiency of the motor and/or provide a reduction in noise.

At least a portion of the strut may be tapered in an axial direction, for example in a direction parallel to a rotational axis of the impeller, such that the width of the strut decreases toward a trailing edge of the strut. This may be beneficial as it may promote laminar airflow through the motor, which may provide improvements in efficiency and/or a reduction in noise. The width of the strut at the leading and/or trailing edge, for example in a circumferential direction, may be less than 50%, less than 40%, less than 30%, less than 20%, or less than 10%, of the length of the strut, for example in an axial direction substantially parallel to a rotational axis of the impeller.

The strut may comprise a trailing edge, for example a downstream edge, and the trailing edge may have a curved profile when viewed in a plane parallel to a direction of airflow through the motor in use. This may be beneficial as this may promote flow of air around the strut, and may avoid the provision of a sharp edge within the airflow through the motor. The trailing edge may define a convex surface when viewed in a direction opposite to a direction of airflow through the motor in use.

At least a portion of the stator assembly, for example a portion of the stator assembly in the region of the recess, may be inclined toward the strut. This may be beneficial as air flowing over the stator assembly may be guided toward the strut in use. This may mean that airflow does not need to change direction a significant amount in order to flow around the strut, and may contribute to a reduction in turbulence and noise within the motor. Outer surfaces of the stator assembly, for example outer surfaces of bobbin arms of the stator assembly, may be inwardly inclined toward respective outer surfaces of the strut.

The strut may extend into the recess such that the strut does not contact the stator assembly. This may be beneficial as it may inhibit transfer of vibration from the stator assembly to the strut, and may provide a reduction in noise compared to, for example, an arrangement where the strut contacts the stator assembly.

The brushless motor may comprise a plurality of stator assemblies and a plurality of struts, each stator assembly having a recess, and each strut extending into the recess of a corresponding stator assembly. Therefore, in a motor with multiple stator assemblies, multiple struts may be used to interconnect different parts of the frame, thus increasing strength and stability. Each of the struts may extend into the recess of a corresponding stator assembly to contribute to a reduction in turbulence and noise within the motor.

BRIEF DESCRIPTION OF THE FIGURES

In order to better understand the present invention according to various aspects, and to show more clearly how various aspects of the invention may be put into effect, the invention according to various aspects will now be described, by way of example, with reference to the following drawings.

DETAILED DESCRIPTION OF THE DISCLOSURE

Figure 1:
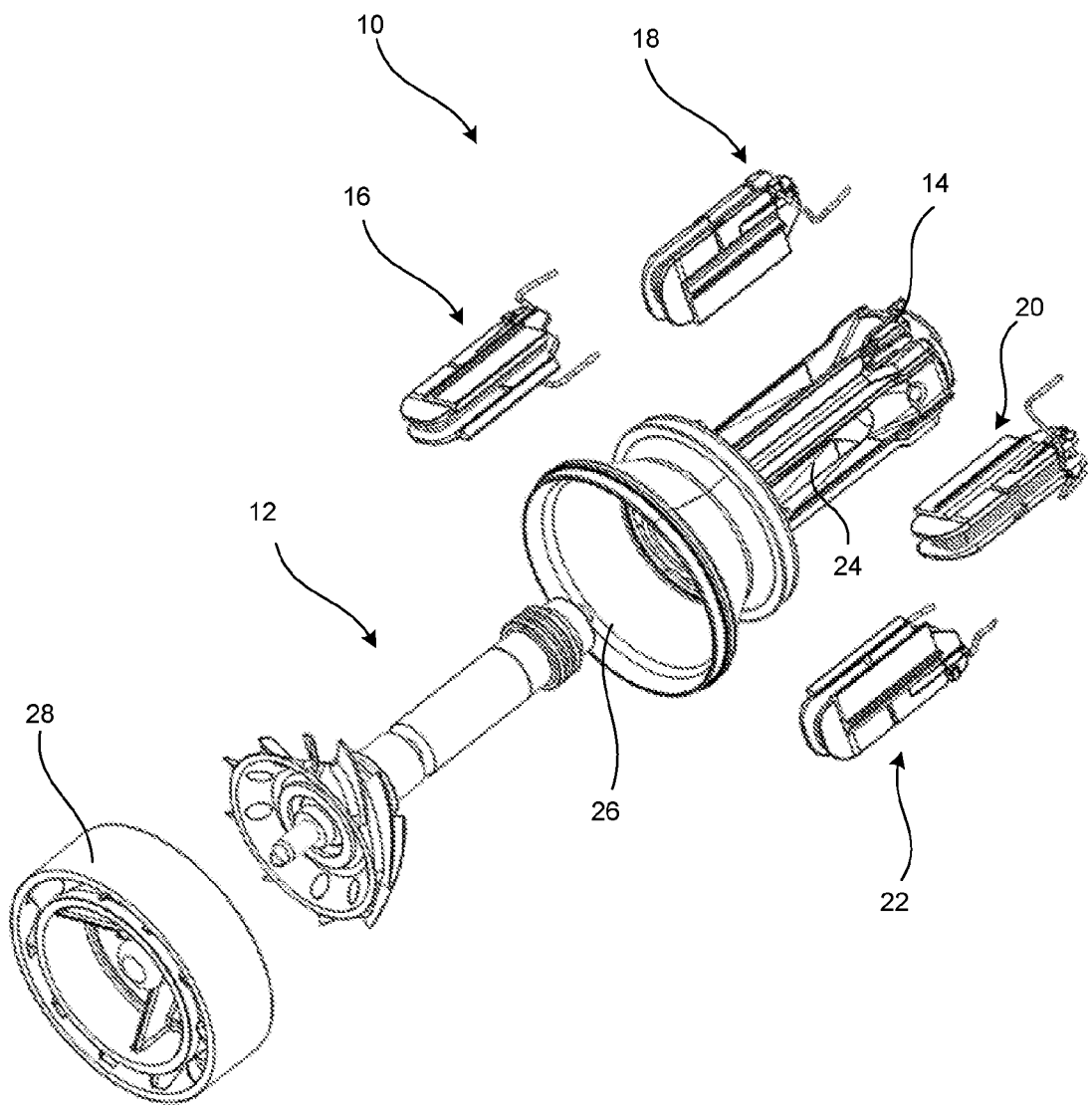
FIG. 1 is an exploded perspective view of a brushless motor according to various aspects of the present invention.
Figure 4:
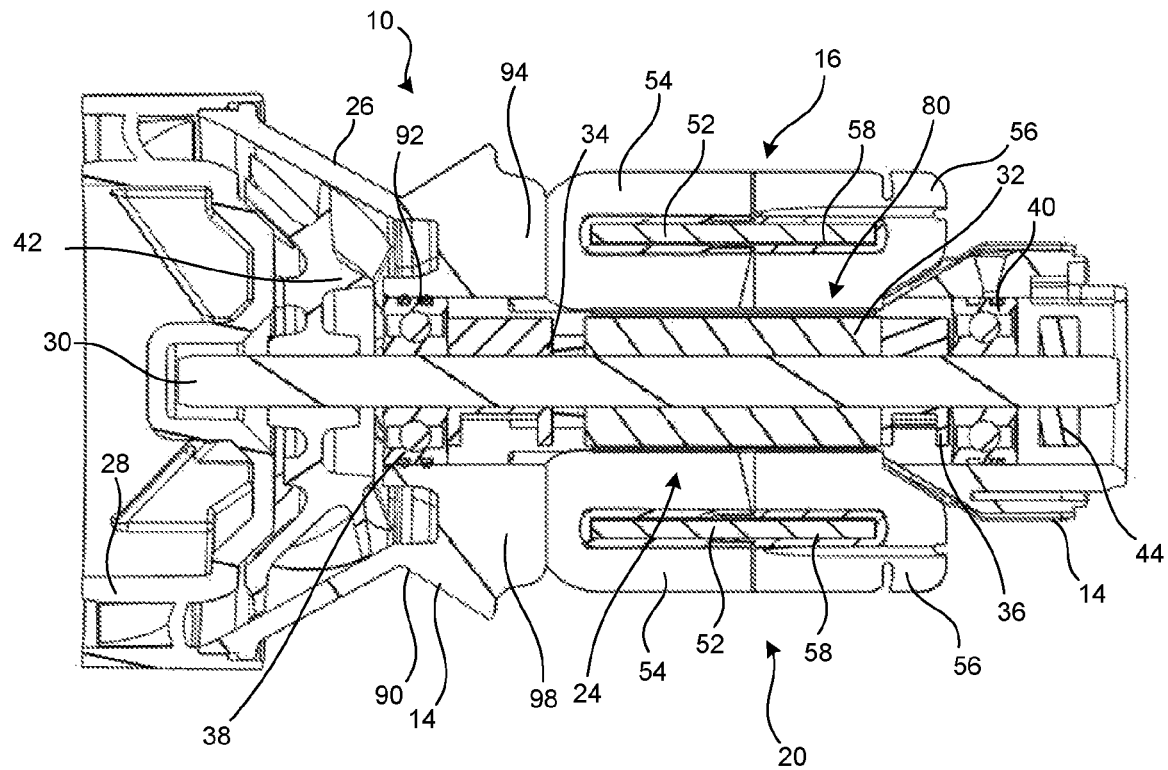
FIG. 4 is a cross-section of the brushless motor of FIG. 1, taken along the axis of rotation of the impeller.

FIG. 1 shows an exploded perspective view of a motor 10 according to an embodiment of the invention. Certain components, such as control electronics and an external housing, are not shown for clarity. The motor 10 includes a rotor assembly 12, a frame 14 and four stator assemblies 16, 18, 20 and 22. When the motor 10 is assembled, the rotor assembly 12 is located within and mounted to the frame 14, and the stator assemblies 16, 18, 20, 22 are located in respective slots in the frame 14. For example, the stator assembly 20 is located within slot 24 in the frame 14. The frame 14 may be a one-piece construction, for example moulded as a single object, and includes an impeller shroud 26 that covers the impeller 42 as shown in FIG. 4. The motor 10 also includes a diffuser 28.

Figure 2:
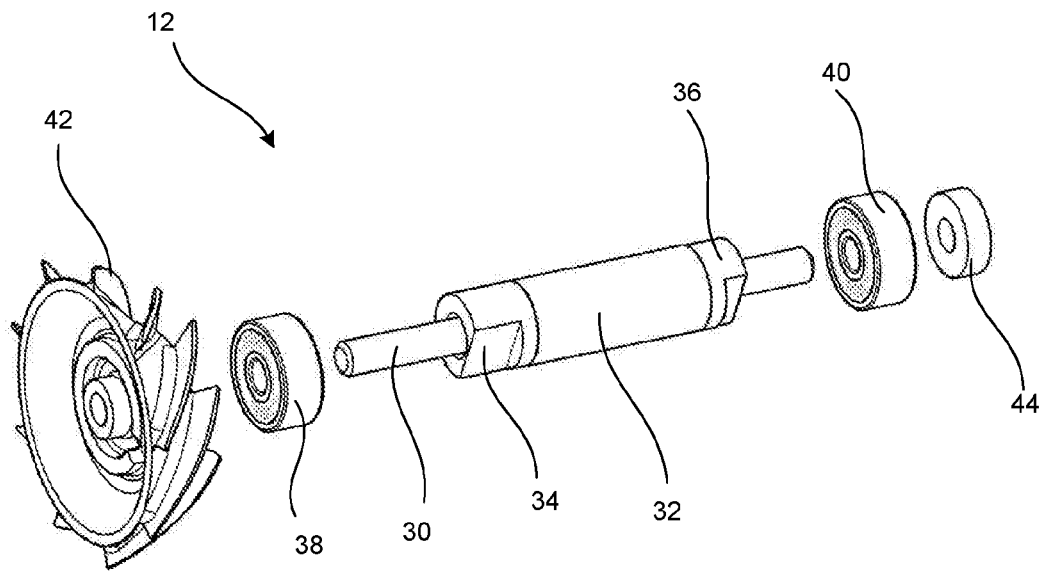
FIG. 2 is an exploded perspective view of a rotor assembly of the brushless motor of FIG. 1.

FIG. 2 shows an exploded perspective view of the rotor assembly 12. The rotor assembly 12 comprises a shaft 30 on which is mounted a rotor core permanent magnet 32, a first balancing ring 34 and a second balancing ring 36. When the rotor assembly 12 is assembled, a pair of bearings 38, 40 are mounted on the shaft 30 on either side of the core 32 and balancing rings 34, 36. An impeller 42 is mounted at one end of the shaft 30, and a sensor magnet 44 is mounted at the other end.

Figure 3:
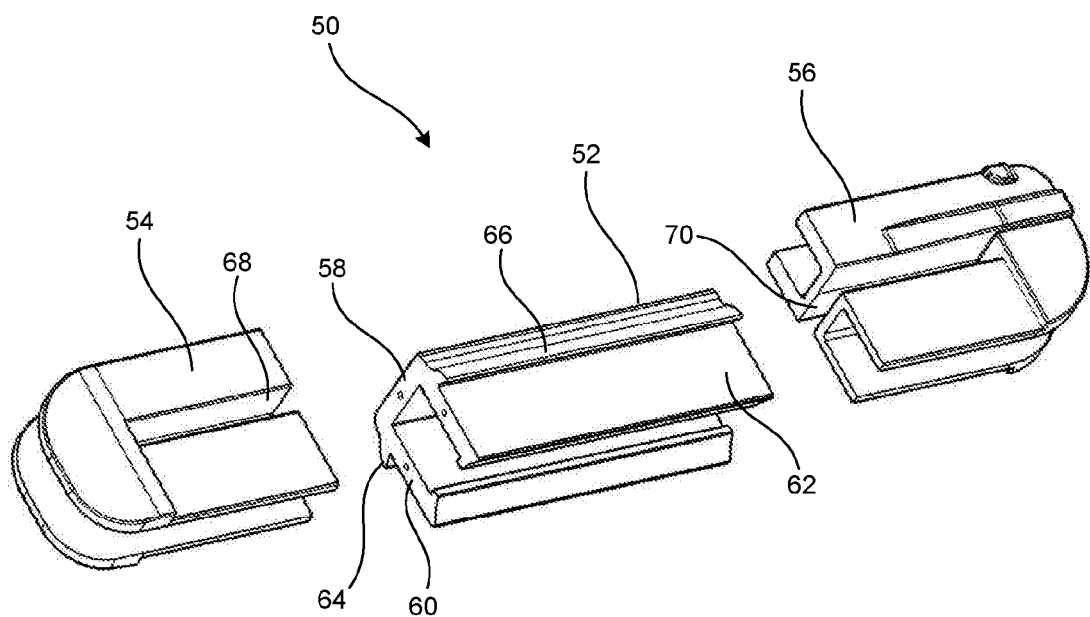
FIG. 3 is an exploded perspective view of a stator of the brushless motor of FIG. 1.

FIG. 3 shows an exploded perspective view of a stator assembly 50. The stator assembly 50 may be any one of the stator assemblies 16, 18, 20, 22 shown in FIG. 1. The stator assembly 50 comprises a C-shaped stator core 52, a first C-shaped bobbin portion 54 and a second C-shaped bobbin portion 56.

The stator core 52 comprises a back 58, a first arm 60 and a second arm 62. Each of the arms 60, 62 includes a respective protrusion 64, 66 on the outer surface of the stator core 52. The protrusions 64, 66 extend along the axial length of the stator core 52.

Figure 5:
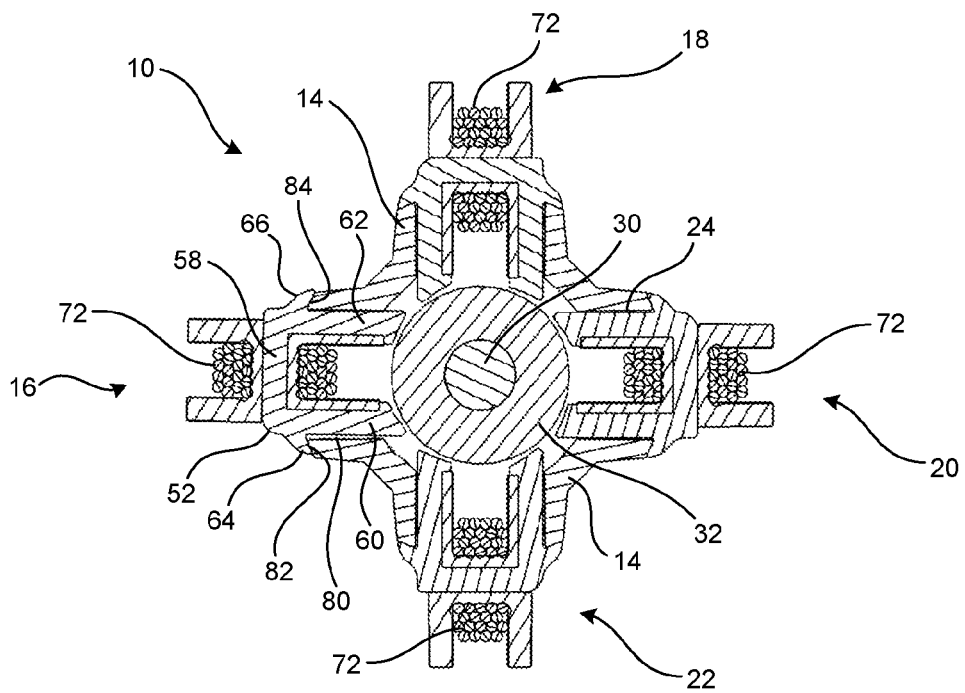
FIG. 5 is a cross-section of the brushless motor of FIG. 1, taken along a direction orthogonal to the axis of rotation of the impeller.

The first bobbin portion 54 includes arms that define a first slot 68. Similarly, the second bobbin portion 56 includes arms that define a second slot 70. The bobbin portions 54, 56 slide onto the stator core 52 such that, when assembled, the slots 68, 70 accommodate the back 58 of the stator core 52 as shown in FIGS. 1, 4 and 5. The bobbin portions 54, 56 have a generally H-shaped cross-section such that a stator winding (not shown) may be wound around the bobbin portions in the assembled stator assembly, and hence around the back 58 of the stator core 52.

FIG. 4 shows a cross-section of the assembled motor 10 through a plane that includes the axis of rotation of the rotor assembly 12. It can be seen that the bearings 38, 40 of the rotor assembly 12 are mounted directly to and within the frame 14. The stator assemblies 16, 20 are also shown inserted into their respective slots in the frame 14. It can be seen that on each stator assembly, the bobbin portions 54, 56 enclose the back 58 of the stator core 52.

FIG. 5 shows a cross-section of the assembled motor 10 through a plane that is orthogonal to the axis of rotation of the rotor assembly 12. The stator assemblies 16, 18, 20, 22 are shown including their respective windings 72. The stator assemblies 16, 18, 20, 22 are shown inserted into their respective slots in the frame 14. For example, stator assembly 16 is inserted into slot 80, whereas stator assembly 20 is shown inserted into slot 24.

The stator assemblies are inserted into their slots until the projections 64, 66 on the arms 60, 62 of the stator core 52 contact respective surfaces of the frame 14. For example, the projections 64, 66 of the stator core 52 of stator assembly 16 contact end surfaces 82, 84 respectively of the slot 80 in the frame 14. As a result, during assembly of the motor 10, each stator assembly may be inserted into its respective slot and slid in a radial direction towards the rotor assembly 12 until the projections contact an appropriate part of the frame 14, such as the edges of the slot. For example, the stator 16 is shown in its fully inserted position, such that the projections 64, 66 contact the edges 82, 84 of the slot 80. The other stator portions 18, 20 and 22 may be inserted into their respective slots in a similar manner.

At this point, further insertion of the stator assembly into the slot is inhibited, and hence further radial movement of the stator assembly into the slot towards the rotor assembly 12 is inhibited. When the stator assemblies 16, 18, 20, 22 have been inserted fully into their respective slots, the stator assemblies may be fixed in position. For example, an adhesive may be applied to the region where the projections 64 and/or 66 contact the frame 14 to prevent further movement of the stator assemblies relative to the frame 14.

Therefore, in the assembled motor 10, the radial position of the stator cores 52 is set based on contact between the stator assemblies and the frame 14. In addition, the radial position of the rotor assembly 12 is set based on contact between the rotor assembly 12 and the frame 14. As a result, the clearance between the pole tips of the stator cores 52 and the rotor core 32 of the rotor assembly 12 is tightly controlled as it depends on tolerances of few components. The clearance can therefore be made smaller without the risk of the stator core pole tips contacting the rotor core 32.

Figure 6:
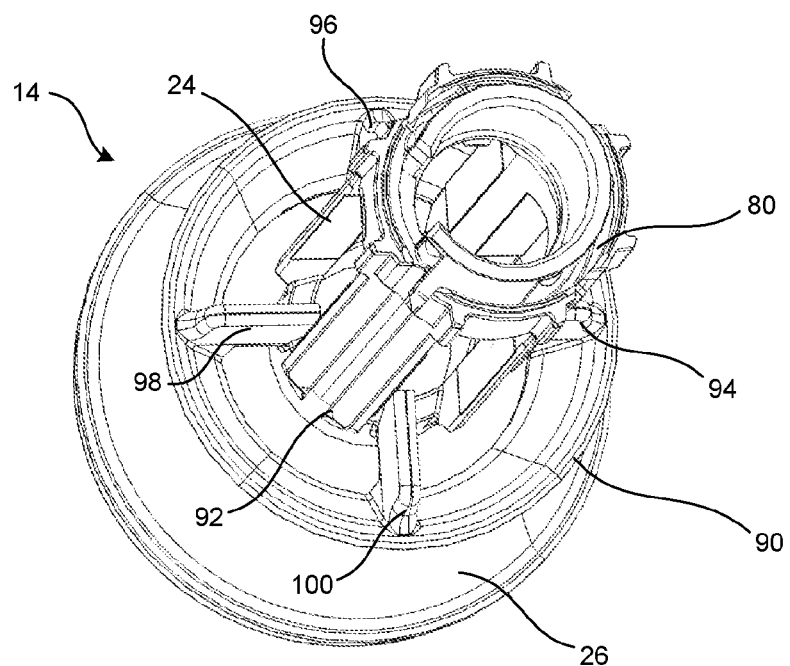
FIG. 6 is a perspective view of a motor frame of the brushless motor of FIG. 1.
Figure 7:
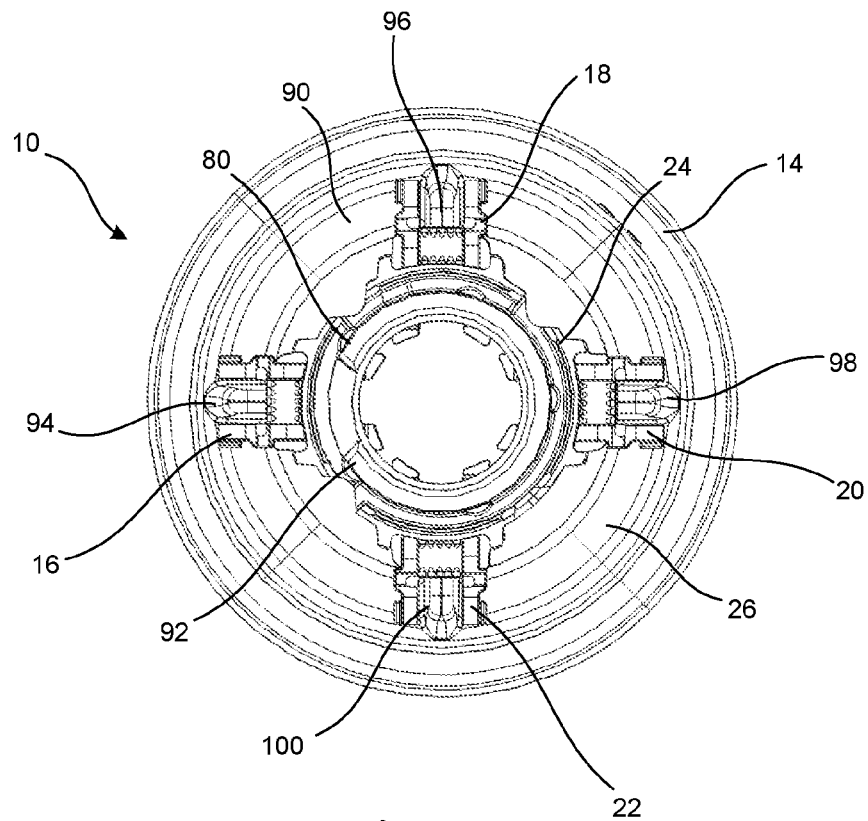
FIG. 7 is an end view of the motor frame and stator assemblies of the brushless motor of FIG. 1.

FIG. 6 shows a perspective view of the frame 14, and FIG. 7 shows a view of the frame 14 and stator assemblies 16, 18, 20, 22 along the axial direction from the end of the frame 14 that comprises the shroud 26. The stator assemblies are shown in FIG. 7 without the windings for clarity. It is shown that the frame 14 comprises an outer portion 90 and an inner portion 92 radially inward of and substantially concentric with the outer portion 90. The inner portion 92 may support the bearings 38, 40 as shown in FIG. 4. The outer portion 90 may include the shroud 26 and may directly or indirectly support other components, such as for example a motor housing or outer casing (not shown).

A plurality of struts 94, 96, 98, 100 extend in a radial direction between the outer portion 90 and the inner portion 92, to support the inner portion 92. In the example shown, there are four struts equally spaced around the circumference of the frame 14, though in other embodiments there may be one or more struts, and/or the struts may not be equally spaced or sized. The outer portion 90 of the frame 14 includes a guide portion 114 that guides the air flow 110 towards one end of the impeller 42 (shown in FIG. 8).

As shown in FIGS. 4, 6, 7 and 8, the struts 94, 96, 98, 100 project axially into the slots in the frame 14 for the stator assemblies (such as slots 24 and 80). Each stator assembly 16, 18, 20, 22 has a recess 120 defined by the gap between opposing bobbin arms, such that when the stator assemblies 16, 18, 20, 22 are inserted into their respective slots, each strut 94, 96, 98, 100 projects into a recess 120 of a corresponding stator assembly 16, 18, 20, 22.

In such a manner, each strut is aligned with a respective stator assembly in an axial direction, such that the strut and the stator assembly are arranged along a line substantially parallel to the rotation axis of the rotor assembly 12.

In use, when the rotor assembly 12 of the motor 10 is rotating, in the embodiment shown, air flows in an axial direction over the stator assemblies 16, 18, 20, 22 and struts 94, 96, 98, 100, between the outer portion 90 and the inner portion 92 and towards the impeller 42. The air is required to flow around any obstacles such as the stator assemblies or struts, which may cause turbulence and noise within the motor. By aligning a strut and a stator assembly along an axial line, the air flow need not change direction to flow over one of these as it is already flowing over the other. In effect, one of these is located within the slipstream of the other. For example, in the motor 10 shown in the figures, the struts 94, 96, 98, 100 are located within the slipstreams of stator assemblies 16, 18, 20 and 22 respectively. This can reduce turbulence and noise compared to a motor where the struts and stator assemblies are not aligned along axial directions.

Furthermore, by arranging the struts 94, 96, 98, 100 such that each strut extends into a recess 120 in a corresponding stator assembly 16, 18, 20, 22, there is no gap between the ends of the stator assemblies 16, 18, 20, 22 and the struts 94, 96, 98, 100 in an axial direction. For example, the ends of the stator assemblies 16, 18, 20, 22 are located adjacent side surfaces of the corresponding struts 94, 96, 98, 100. This may inhibit flow separation at the end of the stator assemblies 16, 18, 20, 22, and may inhibit airflow over the stator assemblies 16, 18, 20, 22 from eddying over the end of the stator assemblies compared to, for example, an arrangement where the stator assemblies 16, 18, 20, 22 and the struts 94, 96, 98, 100 are spaced apart in an axial direction.

Figure 8:
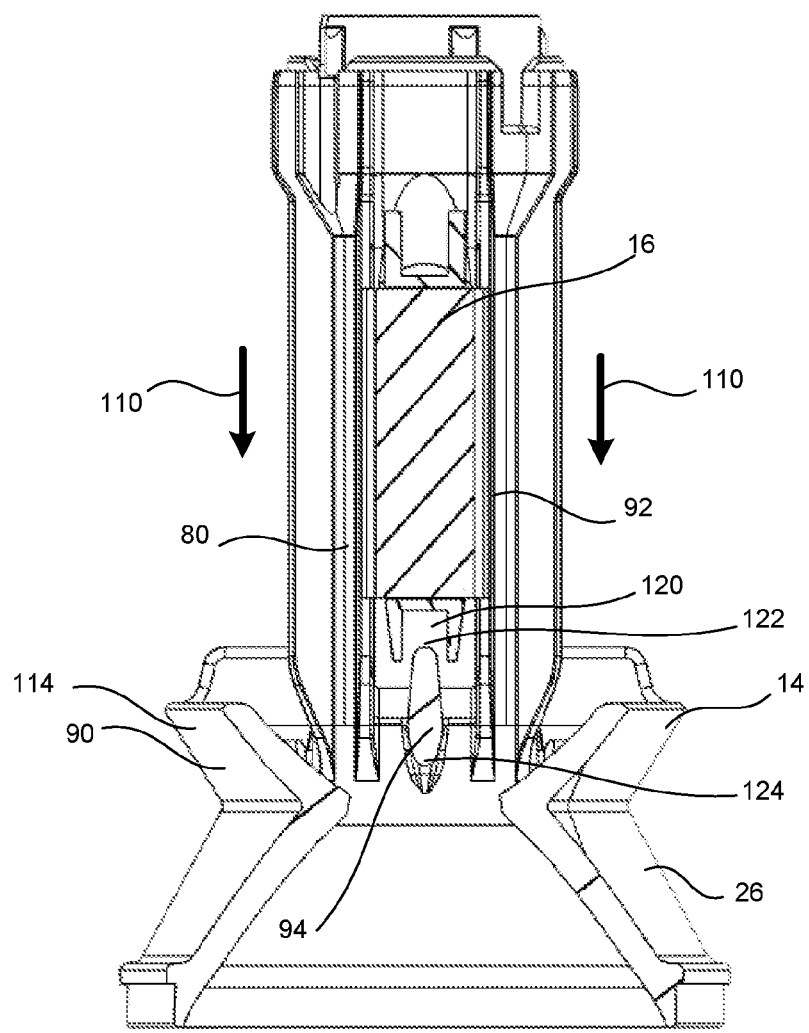
FIG. 8 is a cross-section through the motor frame and a stator assembly of the brushless motor of FIG. 1.

The form of the ends of the stator assembly 16 and corresponding strut 94 can be seen in cross-section in FIG. 8. The ends of the stator assembly 16, in particular the ends of the bobbin arms, are inwardly inclined toward the strut 94, such that the outer surfaces of the bobbin arms direct airflow toward the side surfaces of the strut 94. Thus when air flows over the end of the stator assembly 16, it is not free to eddy, and instead the side surfaces of the strut 94 promote laminar airflow towards the impeller 42.

As can be seen in FIG. 8, both the leading edge 122 and the trailing edge 124 of the strut 94 are curved in nature, such that the leading edge 122 presents a convex surface when viewed in a direction of airflow through the motor 10 (airflow direction through the motor 10 is represented by arrows 110), whilst the trailing edge 124 presents a convex surface when viewed in a direction opposite to the direction of airflow through the motor 10. These curved surfaces may provide acoustic benefits, and may make the motor 10 more efficient.

As can also be seen in FIG. 8, the width of the strut 94 increases away from the leading edge 122, before decreasing toward the trailing edge 124. This may provide the strut 94 with an aerodynamic profile and reduce the occurrence of turbulence and noise once the air has flowed past the strut 94. Although not shown in the figures, substantially the entirety of the leading edge 122 may be received within the recess 120, such that the leading edge 122 does not extend directly into the flow of air through the motor 10 in use. This may provide improved efficiency of the motor 10 and/or provide a reduction in noise.

The invention claimed is:

1. A brushless motor comprising:
 a rotor assembly comprising a shaft, an impeller, a bearing assembly and a rotor core;
 a stator assembly comprising a bobbin and a stator core;
 a frame comprising an outer portion and an inner portion radially inward of the outer portion, the inner portion supporting at least one of the rotor assembly and the stator assembly; and
 a strut extending between the outer portion and the inner portion, wherein the strut extends at least partially into a recess formed in the bobbin.

2. The brushless motor of claim 1, wherein the strut extends into the recess such that such that side surfaces of the strut are positioned at an end of stator assembly.

3. The brushless of claim 1, wherein the stator assembly and the strut are positioned upstream of the impeller.

4. The brushless motor of claim 1, wherein the bobbin comprises first and second arms, the first and second arms are spaced apart to define the recess, and the recess defines a space for receiving windings of the stator assembly and a space for receiving the strut.

5. The brushless motor of claim 1, wherein the strut comprises a leading edge, and the leading edge defines a convex surface when viewed in a direction of airflow through the brushless motor in use.

6. A brushless motor, comprising:
 a rotor assembly comprising a shaft, an impeller, a bearing assembly and a rotor core;
 a stator assembly;

a frame comprising an outer portion and an inner portion radially inward of the outer portion, the inner portion supporting at least one of the rotor assembly and the stator assembly; and a strut extending between the outer portion and the inner portion, wherein the strut extends at least partially into a recess formed in the stator assembly and comprises a leading edge defining a convex surface when viewed in a direction of airflow through the brushless motor in use, and wherein the entirety of the leading edge of the strut is received within the recess.

7. The brushless motor of claim 1, wherein at least a portion of the strut is tapered in an axial direction such that the width of the strut decreases toward a trailing edge of the strut.

8. A brushless motor of, comprising:
a rotor assembly comprising a shaft, an impeller, a bearing assembly and a rotor core;
a stator assembly;
a frame comprising an outer portion and an inner portion radially inward of the outer portion, the inner portion supporting at least one of the rotor assembly and the stator assembly; and
a strut extending between the outer portion and the inner portion, wherein the strut extends at least partially into a recess formed in the stator assembly and comprises a trailing edge, the trailing edge defining a convex surface when viewed in a direction opposite to a direction of airflow through the motor in use.

9. The brushless motor of claim 1, wherein at least a portion of the stator assembly is inclined toward the strut.

10. The brushless motor of claim 1, wherein the strut extends into the recess such that the strut does not contact the stator assembly.

11. A brushless motor of, comprising:
a rotor assembly comprising a shaft, an impeller, a bearing assembly and a rotor core;
a plurality of stator assemblies;
a frame comprising an outer portion and an inner portion radially inward of the outer portion, the inner portion supporting at least one of the rotor assembly and the plurality of stator assemblies; and
a plurality of struts between the outer portion and the inner portion, each stator assembly having a recess, and each strut extending at least partially into the recess of a corresponding stator assembly.

* * * * *